US006966435B2

(12) United States Patent
Weiser et al.

(10) Patent No.: US 6,966,435 B2
(45) Date of Patent: Nov. 22, 2005

(54) ORIENTED POLYMER HINGE PINS IN MODULAR PLASTIC CONVEYOR BELTS

(75) Inventors: David C. Weiser, River Ridge, LA (US); Kyle J. Sedlacek, New Orleans, LA (US); Sandra A. Christiana, Harahan, LA (US); Andrew A. Corley, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 10/493,257

(22) PCT Filed: Nov. 7, 2002

(86) PCT No.: PCT/US02/35799

§ 371 (c)(1),
(2), (4) Date: Apr. 21, 2004

(87) PCT Pub. No.: WO03/040010

PCT Pub. Date: May 15, 2003

(65) Prior Publication Data

US 2004/0200698 A1    Oct. 14, 2004

Related U.S. Application Data

(60) Provisional application No. 60/337,510, filed on Nov. 8, 2001.

(51) Int. Cl.[7] ............................................. B65G 17/06
(52) U.S. Cl. ...................... 198/851; 198/850; 198/852; 198/853; 244/33 R
(58) Field of Search ................................ 198/850, 851, 198/852, 853, 957; 244/33 R

(56) References Cited

U.S. PATENT DOCUMENTS

| | | | | |
|---|---|---|---|---|
| 4,023,239 A | * | 5/1977 | Stolz | 24/33 P |
| 4,024,605 A | * | 5/1977 | Henke | 24/33 P |
| 4,053,270 A | | 10/1977 | Collier et al. | 425/144 |
| 4,195,887 A | * | 4/1980 | Ruddell | 305/42 |
| 4,600,631 A | | 7/1986 | Alei et al. | 428/212 |
| 4,647,640 A | | 3/1987 | Capaccio et al. | 516/348.1 |
| 4,903,824 A | * | 2/1990 | Takahashi | 198/853 |
| 5,125,874 A | * | 6/1992 | Fryer et al. | 474/214 |
| 5,204,045 A | | 4/1993 | Courval et al. | 264/323 |
| 5,573,106 A | * | 11/1996 | Stebnicki | 198/853 |
| 5,678,683 A | * | 10/1997 | Stebnicki et al. | 198/853 |
| 5,957,268 A | * | 9/1999 | Meulenkamp | 198/850 |
| 6,036,002 A | * | 3/2000 | Kobayashi et al. | 198/853 |
| 6,164,439 A | * | 12/2000 | Stebnicki et al. | 198/853 |
| 6,439,378 B1 | * | 8/2002 | MacLachlan | 198/850 |
| 6,648,129 B2 | * | 11/2003 | Sedlacek | 198/850 |

* cited by examiner

Primary Examiner—Douglas Hess
(74) Attorney, Agent, or Firm—James T. Cronvich

(57) ABSTRACT

A modular plastic conveyor belt hingedly interconnected by hinge pins made of a highly oriented polymer material. The hinge pins are preferably extruded from a material including a highly oriented polymer, such as polyethylene, polypropylene, or nylon. Alternative materials include highly oriented acetal or polyurethane. Plastic hinge pins made with these polymers having their long molecules oriented along the axis of the shaft of the hinge pin are exceptionally strong and resistant to deformation.

3 Claims, 2 Drawing Sheets

ORIENTED POLYMER HINGE PINS IN MODULAR PLASTIC CONVEYOR BELTS

CROSS-REFERENCE TO RELATED APPLICATIONS

Figure 1:
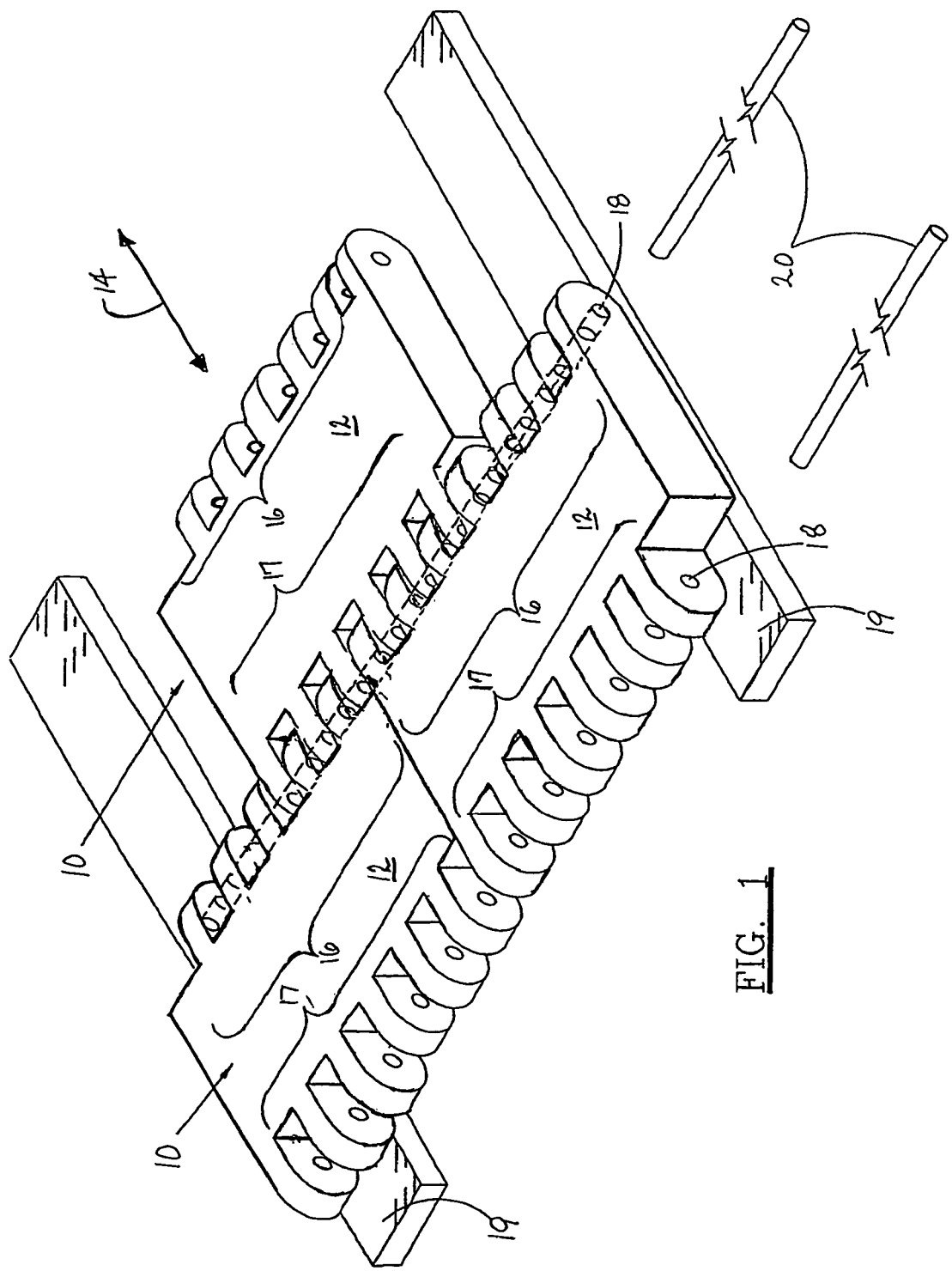

This application claims the benefit of U.S. Provisional Application No. 60/337,510, filed Nov. 8, 2001.

BACKGROUND

The invention relates to modular plastic conveyor belts and, more particularly, to hinge pins for connecting consecutive modular belt rows together, wherein the hinge pins are made of an oriented polymer material.

Because they do not corrode and are easy to maintain, modular plastic conveyor belts are widely used in many industries to convey articles. These belts, or chains, are typically constructed of a series of rows of one or more belt modules connected end to end into an endless conveyor belt. Each row includes spaced apart hinge elements at each end with apertures formed through them. The hinge elements along one end of a row are interleaved with the hinge elements along an end of an adjacent row. The apertures of the interleaved hinge elements are aligned and form a passageway. A hinge pin inserted in the passageway serves to connect the rows together and to allow them to pivot about the axis of the pin so that the belt can backflex or articulate about a drive sprocket. Hinge pins are typically molded or extruded of a thermoplastic material, such as polypropylene, polyethylene, nylon, acetal, or composite polymers.

As the belt moves, belt tension is borne not only by the modules but also by the hinge pins. Each row of belt modules pulls the trailing rows. This belt pull, or tension, is transmitted row to row through the hinge pins. With each row of interleaved hinge elements pulling in opposite directions, the hinge pin can, over time, deform, assuming a corrugated, or stepped, shape resembling a cam shaft. Cam-shafting of hinge pins causes problems.

One problem caused by cam-shafted hinge pins is scrubbing of the hinge pin against the walls of the apertures in the hinge elements. Because a cam-shafted hinge pin has a preferred orientation relative to its confining hinge elements, scrubbing and the consequent wear are concentrated on the same portions of the hinge pin's outer surface. This tends to accelerate the wear of the hinge pin.

A second problem caused by cam-shafted hinge pins is elongation of the belt. A cam-shafted hinge pin connecting two adjacent rows of belt modules allows the apertures of one row to move out of alignment with those of the adjacent row, effectively lengthening the pitch of the row and stretching the belt's overall length. Wallowing out of the apertures by scrubbing against the hinge pin adds to the belt-stretching problem. The increased length means more sag in the belt on the returnway, for which space must be allocated. The longer pitch of the belt can adversely affect engagement of the belt with fixed-pitch drive and idler sprockets. Poor sprocket engagement makes for a less uniform conveying speed and a bumpier ride. Accelerated wear of, and even damage to, the belt drive surfaces and the sprockets are other results of poor sprocket engagement. Conditions such as heavy loading and high temperatures can exacerbate these problems caused by cam-shafted hinge pins.

One way these problems have been addressed is through the use of larger diameter hinge pins for increased strength and less susceptibility to deformation. Another approach is to change the geometry of the modules to compensate for weak hinge pins. But these approaches often represent compromises that adversely affect other performance characteristics. For example, larger hinge pins require larger hinge-element apertures, which means that, with more material removed, the hinge element is inherently weaker.

Yet another approach is the use of stainless steel hinge pins, which are inherently stronger and stiffer and unlikely to deform as much as conventional plastic hinge pins. But steel hinge pins are heavy. The added weight increases the tensile load on the belt modules and may require larger drive motors. Furthermore, special pin retention schemes are often necessary to retain stainless steel hinge pins in belts.

Thus, there is a need for a modular plastic conveyor belt that does not stretch over time, especially in heavy-load applications.

SUMMARY

These needs and others are satisfied by a modular plastic conveyor belt with a hinge pin embodying features of the invention. The belt is constructed of a series of rows of one or more belt modules. Each module extends from a first end to a second end in the direction of belt travel. A first set of hinge elements is arranged along the first end of the modules in each row; a second set, along the second end. The first set of hinge elements of a row interleaves with the second set of hinge elements of an adjacent row. Aligned apertures formed in the interleaved hinge elements define a passageway through the hinge elements. A hinge pin disposed in the passageway forms a hinge joint between adjacent rows. To prevent the belt from stretching, the hinge pin includes a shaft made of a highly oriented polymer material for strength. The material is preferably a highly oriented polypropylene, polyethylene, or nylon. As an alternative, the material could be a highly oriented acetal or polyurethane. These polymers, with their molecules oriented along the length of the shaft, give the hinge pin high sheer strength and decrease its tendency to deform in a belt under tension.

DRAWINGS

Figure 2:
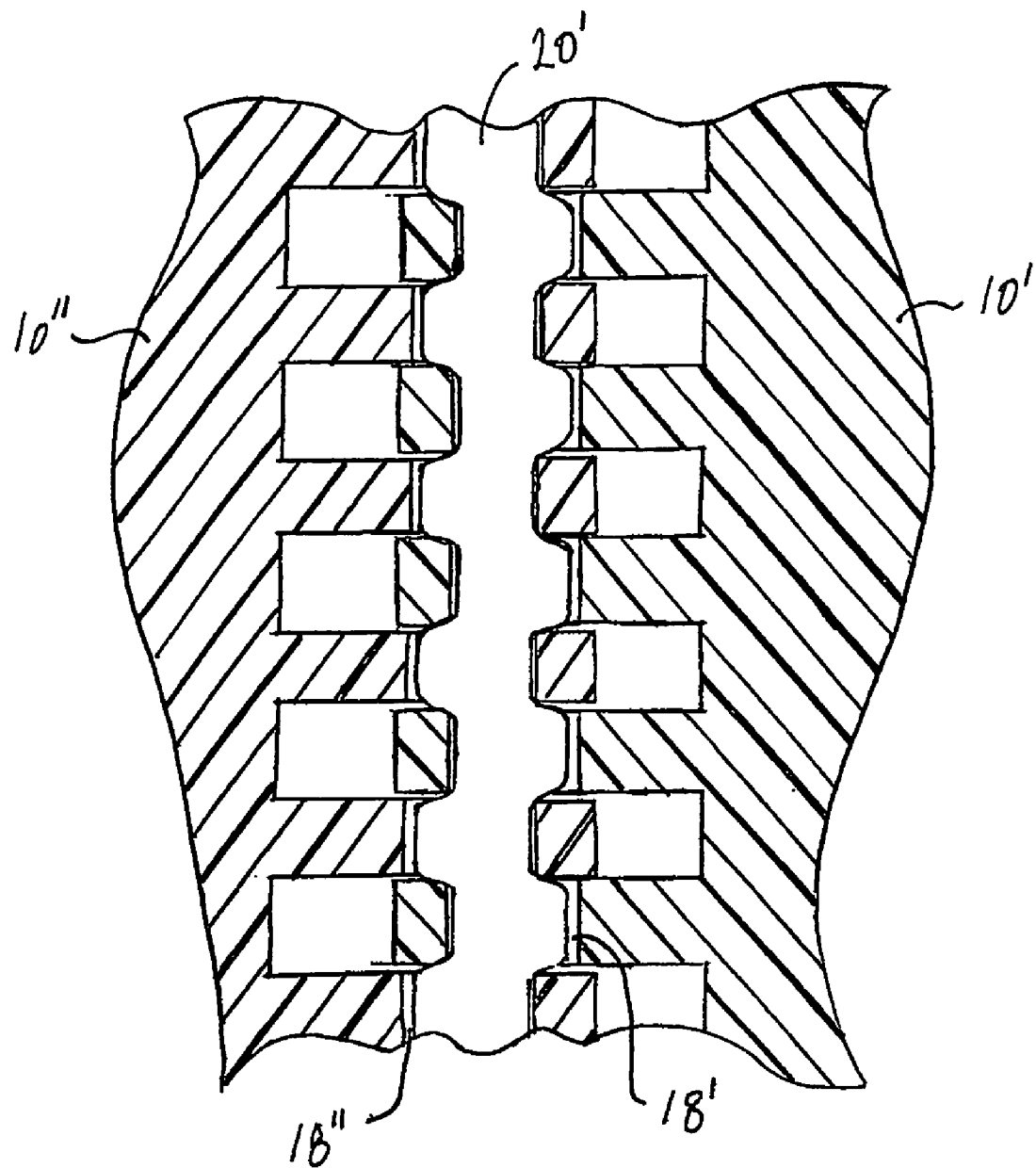

These and other features, aspects, and advantages of the invention are described in more detail in the following description, appended claims, and accompanying drawings, in which:

FIG. 1 is an isometric view of a portion of a modular plastic conveyor belt connected by hinge pins embodying features of the invention; and FIG. 2 is a partial top view of a prior art cam-shafted hinge pin in a conveyor belt shown cut away.

DETAILED DESCRIPTION

A portion of a modular conveyor belt connected by hinge pins embodying features of the invention is shown in FIG. 1. The belt includes a series of rows 10 of belt modules 12. Each belt module extends from a first end to a second end in a direction of belt travel 14. Each module includes a first set of hinge elements 16 along the first end and a second set of hinge elements 17 along the second end. Each of the hinge elements has an aperture 18 formed therethrough. The apertures of each set are aligned across the width of the module. The modules are typically formed by injection-molding and made of a thermoplastic material, such as polypropylene, polyethylene, acetal, nylon, or a composite material that may include non-plastic fibers for strength.

Belts made of such modules are manufactured and sold, for example, by Intralox, Inc. of Harahan, La., USA.

The modular plastic conveyor belt is assembled by interleaving the first set of hinge elements of a row with the second set of hinge elements of an adjacent row. Each row may include one or more modules. When multiple modules are used in each row, the modules are positioned side by side in the row and end to end with the modules of adjacent rows typically in a brick-lay pattern and supported on wearstrips 19. The aligned apertures of the interleaved hinge elements form a passageway between each row across the width of the belt. The shafts of hinge pins 20 are inserted into the passageways to interconnect the modules of one row to those of an adjacent row and to form with the hinge elements a hinge joint between adjacent rows. The belt can articulate about a drive sprocket or drum at the hinge joints.

When the belt is driven, the modules and their hinge elements are in tension. The rows try to separate, but are held together by the hinge pins. Over time, a conventional plastic hinge pin 20' assumes a cam-shaft shape as illustrated in FIG. 2. The apertures 18', 18" of adjacent rows 10', 10" are offset out of coaxial alignment in accordance with the amount of cam-shafting. Adjacent belt rows are separated, and the entire belt is longer. Conventional plastic hinge pins, which are typically extruded or molded of a thermoplastic such as polypropylene, polyethylene, acetal, or nylon, are especially susceptible to cam-shafting in heavy-load applications.

To avoid cam-shafting of hinge pins and the associated problems, strong hinge pins 20 made of an oriented polymer material are used to interconnect belt rows into a conveyor belt as in FIG. 1. The hinge pin is preferably extruded according to the process described in U.S. Pat. No. 5,169,587, "Process for Extruding Large Oriented Polymer Shapes," Gregory J. Courval, the disclosure of which is hereby incorporated by reference. A preferred group of polymers used in the highly oriented polymer material include polypropylene, polyethylene, and nylon. Other materials that could be highly oriented include acetal and polyurethane. A hinge pin with its long polymer molecules oriented axially along the rod exhibits high shear strength and resists deformation. A belt interconnected with hinge pins made of these oriented polymers is less likely to stretch—even under heavy loading or at high temperatures. Because the hinge pin is made of plastic, the belt does not suffer the consequences of using heavy stainless steel pins. Furthermore, the hinge pin can be retained in the passageway using familiar headless rod retention schemes, or the hinge pin can be headed at one end and retained conventionally by snap-fit or obstruction.

Thus, a conveyor belt hingedly interconnected by strong hinge pins made of a highly oriented polymer material avoids stretching and maintains its pitch without a significant increase in weight.

It should be recognized that the strength advantages provided by oriented polymers could also be applied to plastic conveyor belt modules and to conveyor accessories, such as flights, sideguards, hold down tabs, and sprockets, to name a few. Making these articles out of a highly oriented polymer material could increase their lives in certain applications.

The invention has been described in detail with respect to preferred versions, but the scope of the claims should not be limited to the description of the preferred versions.

What is claimed is:

1. A modular plastic conveyor belt comprising:
   a series of rows of belt modules wherein each row includes at least one belt module extending from a first end to a second end in the direction of belt travel and including a first set of hinge elements along the first end and a second set of hinge elements along the second end, wherein the hinge elements form aligned apertures therethrough and wherein the rows are arranged end to end with the first set of hinge elements of a row interleaved with the second set of hinge elements of an adjacent row, the aligned apertures of the interleaved hinge elements defining a passageway between adjacent rows; and
   a hinge pin disposed in the passageway to form a hinge joint between adjacent rows,
   wherein the hinge pin includes a shaft made of a polymer material by an extrusion process deforming the polymer material in a melted state through a pressure chamber and a die to orient long polymer molecules of the pollymer material axially along the shaft into a polymer shape having a highly oriented fibrillar morphology.

2. A modular plastic conveyor belt as in claim 1, wherein the highly oriented polymer is selected from the group consisting of polypropylene, polyethylene, and nylon.

3. A modular plastic conveyor belt as in claim 1 wherein the highly oriented polymer is selected from the group consisting of acetal and polyurethane.

* * * * *